US007280882B1

(12) United States Patent
Daoud et al.

(10) Patent No.: US 7,280,882 B1
(45) Date of Patent: Oct. 9, 2007

(54) SYSTEMS AND METHODS FOR FORECASTING DEMAND FOR A SUBCOMPONENT

(75) Inventors: Bassel H. Daoud, Parsippany, NJ (US); Christopher K. Wiese, Long Valley, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/376,928

(22) Filed: Mar. 16, 2006

(51) Int. Cl.
*G06F 19/00* (2006.01)
(52) U.S. Cl. ............. 700/107; 700/100; 700/105; 705/8; 705/10
(58) Field of Classification Search ............ 700/99, 700/100, 101, 102, 105, 106, 107; 705/7, 705/8, 22, 28, 29, 10
See application file for complete search history.

(56) References Cited

U.S. PATENT DOCUMENTS

| | | | | |
|---|---|---|---|---|
| 5,953,707 A | * | 9/1999 | Huang et al. ................ 705/10 |
| 6,119,102 A | * | 9/2000 | Rush et al. .................. 705/29 |
| 6,151,582 A | * | 11/2000 | Huang et al. ................. 705/8 |
| 6,681,141 B2 | * | 1/2004 | Ferreri et al. ............... 700/106 |
| 6,920,366 B1 | * | 7/2005 | Luh et al. .................... 700/101 |
| 6,920,427 B2 | * | 7/2005 | Anthony et al. ............... 705/8 |
| 2004/0064350 A1 | * | 4/2004 | Hanazato et al. .............. 705/7 |
| 2005/0159971 A1 | * | 7/2005 | Woehler ....................... 705/1 |

* cited by examiner

*Primary Examiner*—Leo Picard
*Assistant Examiner*—Charles Kasenge

(57) ABSTRACT

Techniques for determining how to translate forecast sales data of at least one configuration of assembled product into a forecast schedule of subcomponents composing the assembled product is described. To this end, forecast sales data of at least one configuration of assembled product is received. Usage factors of a plurality of subcomponents composing the assembled product are also received. Each usage factor corresponds to the at least one configuration of assembled product. The forecast schedule of subcomponents composing the assembled product is then composed by applying the usage factors of the plurality of subcomponents to the forecast sales data of at least one configuration of assembled product wherein the forecast schedule includes demand for the subcomponents over time.

20 Claims, 10 Drawing Sheets

→ 510 RECEIVE FORECAST SCHEDULE DATA FOR ONE OR MORE ASSEMBLED PRODUCTS OVER A PERIOD OF TIME

→ 520 DIVIDE THE FORECAST SCHEDULE DATA FOR EACH ASSEMBLED PRODUCT ACCORDING TO ITS SUBCOMPONENT COMPOSITION

→ 530 COMBINE THE DIVIDED FORECAST SCHEDULE DATA ACCORDING TO LIKE SUBCOMPONENTS

→ 540 ARRANGE THE SUBCOMPONENT FORECAST SCHEDULE TO MEET A DEMAND PLAN ON A MONTHLY BASIS FOR EACH SUBCOMPONENT ACROSS VARYING ASSEMBLED PRODUCT CONFIGURATIONS

→ 550 OPTIONALLY, RECEIVE CONTRACT WINS/LOSS DATA TO REFLECT FORECAST CHANGES ON SUBCOMPONENT FORECAST SCHEDULE

→ 560 GENERATE FORECAST SCHEDULE DATA FOR COMMON SUBCOMPONENTS ACROSS ONE OR MORE ASSEMBLED PRODUCTS OVER A PERIOD OF TIME

→ GOTO 340

FIG. 8

| | A | B | C | D | E | F | G | H | I | J | K | L | M | N | O | P | Q | R | S |
|---|---|---|---|---|---|---|---|---|---|---|---|---|---|---|---|---|---|---|---|
| 1 | | | | | | | | Forecast | Forecast | | Forecast | | | | | | Forecast | | |
| 2 | | | | | | | | 25 | P17 | | P18 | | | 26 | P19 | | P20 | | |
| 3 | | FY06 Projects | Configuration1 | Configuration2 | Configuration3 | Effectivity Date | | Oct-05 | Nov-05 | Dec-05 | Jan-06 | Feb-06 | Mar-06 | Apr-06 | May-06 | Jun-06 | Jul-06 | Aug-06 | Sep-06 |
| | | | 1000 | 1500 | 3000 | | | | | | | | | | | | | | |
| 4 | | Units/FY06 | 200 | 300 | 600 | | Annual Forecast | | | | | | | | | | | | |
| 5 | | Q1-FY06 | 250 | 375 | 750 | | 15,500 | | | | | | | | | | | | |
| 6 | | Q2-FY06 | 300 | 450 | 900 | | 39,000 | | | | | | | | | | | | |
| 7 | | Q3-FY06 | 250 | 375 | 750 | | 33,000 | | | | | | | | | | | | |
| 8 | | Q4-FY06 | | | | | 5,500 | | | | | | | | | | | | |
| 9 | | Cabinet | 1 | 1 | 1 | Oct-05 | | 367 | 367 | 367 | 458 | 458 | 458 | 550 | 550 | 550 | 458 | 458 | 458 |
| 10 | | Radio | 3 | 3 | 3 | Jul-06 | | 2,600 | 2,600 | 2,600 | 3,250 | 3,250 | 3,250 | 3,900 | 3,900 | 3,900 | 3,250 | 3,250 | 3,250 |
| 11 | | Filter | 6 | 6 | 6 | Jul-06 | | 2,200 | 2,200 | 2,200 | 2,750 | 2,750 | 2,750 | 3,300 | 3,300 | 3,300 | 2,750 | 2,750 | 2,750 |
| 12 | | Amplifier | 3 | 3 | 3 | Apr-06 | | 2,600 | 2,600 | 2,600 | 3,250 | 3,250 | 3,250 | 3,900 | 3,900 | 3,900 | 3,250 | 3,250 | 3,250 |
| 13 | | Backplane | 1 | 1 | 1 | Jun-06 | | 367 | 367 | 367 | 458 | 458 | 458 | 550 | 550 | 550 | 458 | 458 | 458 |

SYSTEMS AND METHODS FOR FORECASTING DEMAND FOR A SUBCOMPONENT

FIELD OF THE INVENTION

The present invention relates generally to improvements in the field of project management, and, in particular, to systems and methods for forecasting demand at a subcomponent level across at least one configuration of an assembled product.

BACKGROUND OF THE INVENTION

Typically, the price at which an assembled product can be sold drops rather quickly over the life time of the product. An assembled product such as a telecommunication base station may comprise many subcomponents. Furthermore, the telecommunication base station may be sold in various configurations to meet customer scaling requirements. Each configuration may include a different quantitative mix of subcomponents. To be competitive in today's global economy and maintain a consistent profit, a business enterprise, which builds and sells the assembled product, needs to manage the costs of these subcomponents.

Many times these subcomponents can be replaced by cheaper subcomponent's due to technology advances, manufacturing efficiency, and the like. Integrating new subcomponents into an assembled product can prove costly depending on the new subcomponents complexity. For example, a new subcomponent may require additional software for it to operate in the assembled product, a new wiring plan to electrically connect the new subcomponent to the assembly, a new packaging plan for the assembled product, and the like.

Since operating budgets of the business enterprise are limited, how does the business enterprise decide which subcomponents should be replaced? Out of the subcomponents chosen to be replace, what goals should be used to determine a reasonable price reduction target? Without any goals, how can allocating development resources between projects defined by each new subcomponent be justified? When would be the best time to introduce an assembled product with one or more new subcomponents to minimize stranded inventory and maximize savings? How does a business enterprise measure the effectiveness of introducing the assembled product with one or more new subcomponents? Conventionally, management teams of the business enterprise introduce an assembled product on an adhoc basis without being able to answer these and other related questions, resulting in wasting time on replacing subcomponents which do not affect the bottom line, increased development costs, and shrinking profits, if any at all, remain after introducing the new subcomponents.

SUMMARY OF THE INVENTION

Among its several aspects, the present invention recognizes and addresses the need for computer implemented methods and computer readable medium for translating forecast sales data of at least one configuration of assembled product into a forecast schedule of subcomponents composing the assembled product. To this end, forecast sales data of at least one configuration of assembled product is received. Usage factors of a plurality of subcomponents composing the assembled product are also received. Each usage factor corresponds to the at least one configuration of assembled product. The forecast schedule of subcomponents composing the assembled product is then composed by applying the usage factors of the plurality of subcomponents to the forecast sales data of at least one configuration of assembled product wherein the forecast schedule includes demand for the subcomponents over time.

A more complete understanding of the present invention, as well as further features and advantages of the invention, will be apparent from the detailed description, the accompanying drawings, and the claims.

BRIEF DESCRIPTION OF THE DRAWINGS

FIG. 5 shows a flow chart of a method for determining forecast schedule data for subcomponents common across one or more assembled products in accordance with the present invention.

FIG. 8 shows an exemplary spreadsheet utilized as implementing the forecasting and coincident component 230 in accordance with the present invention.

DETAILED DESCRIPTION

The present invention will now be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

As will be appreciated by one of skill in the art, the present invention may be embodied as methods, systems, or computer readable media. Furthermore, the present invention may take the form of a computer program on a computer-usable storage medium having computer-usable program code embodied in the medium. Any suitable computer readable medium may be utilized including hard disks, CD-ROMs, optical storage devices, flash memories, magnetic storage devices, or the like.

Computer program code or "code" for carrying out operations according to the present invention may be written in an object oriented programming language such as JAVA®, JavaScript®, Visual Basic®, C, C++ or in various other programming languages or may be written in the form of a spreadsheet such as one which is run in a Microsoft Excel® or Lotus 123 environment. Software embodiments of the present invention do not depend on implementation with a particular programming language or spreadsheet. Portions of the code may execute entirely on one or more systems utilized by a server in the network or a mobile device.

Figure 1:
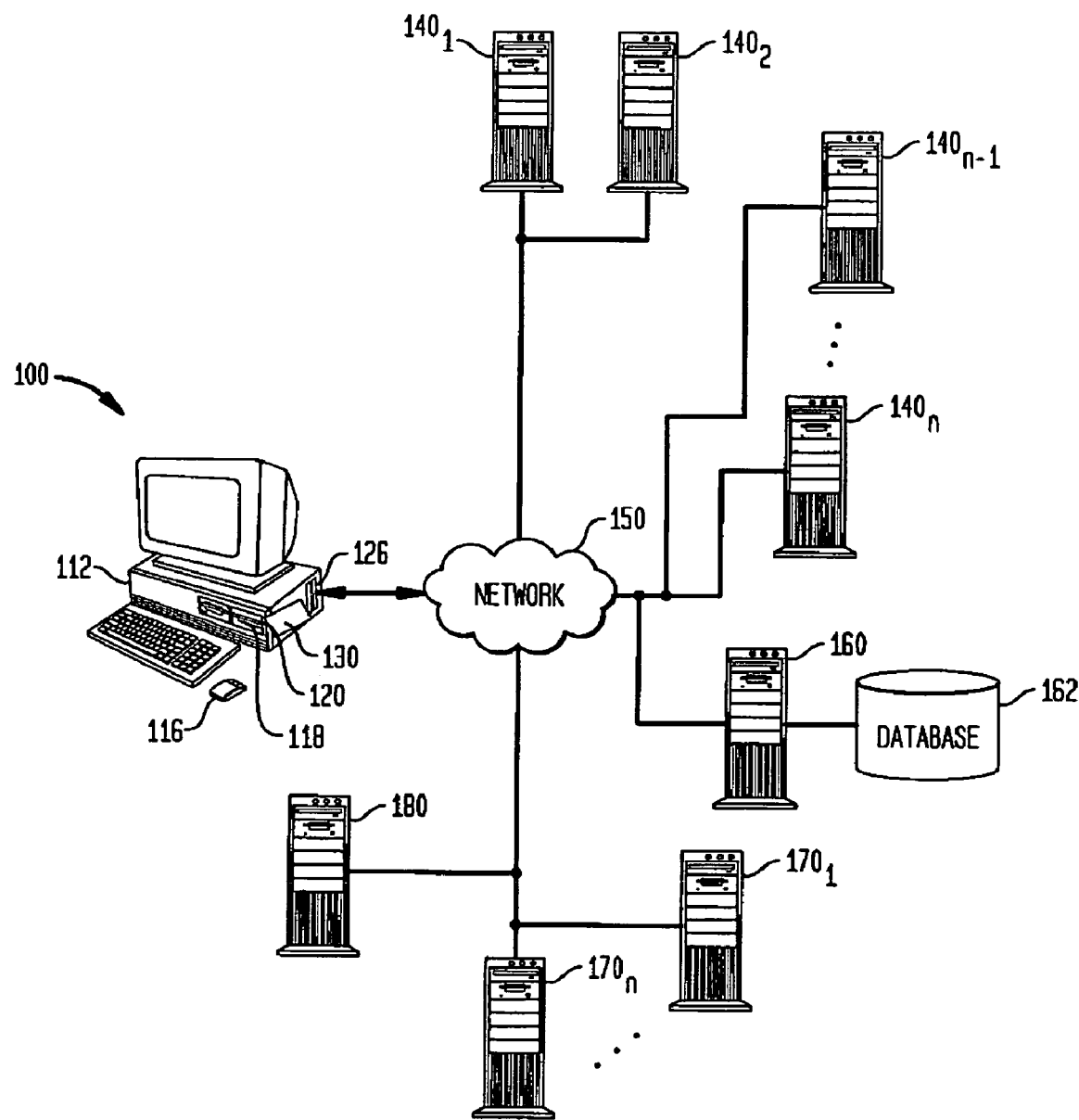
FIG. 1 shows an illustrative system employing a cost reduction project management system in accordance with the present invention.

FIG. 1 shows a diagram of a system 100 employing a cost reduction project management system in an environment accordance with the present invention. The illustrated system 100 is implemented as a stand-alone personal computer or workstation 112. As described in further detail below, system 100 includes cost reduction project management software 130 in accordance with the present invention which is stored in memory and run by the central processing unit of the personal computer 112. The presently preferred cost reduction project management software 130 is embodied in an Excel spreadsheet. However, the present invention contemplates that the data stored in the Excel spreadsheet may alternatively be stored in a database. In that environment, the cost reduction project management software 130 may be embodied as a program which stores, retrieves, and modifies the data in the database. Cost reduction project management software 130 achieves one or more of the steps defined in FIG. 3.

The computer 112 includes a number of standard input and output devices, including a keyboard 114, mouse 116, CD-ROM drive 118, disk drive 120, and monitor 122. Optionally, the computer 112 includes an Internet or network connection 126 to automatically retrieve over network 150 input data utilized by cost reduction project management software 130 such as inventory data of sub-components from remote suppliers utilizing known systems such as electronic manufacturer services (EMS), supply chain portal, Webplan®, DataMart® implemented on computing systems $140_1 \ldots 140_n$, respectively, general availability dates for subcomponents from design and development system 180, forecast data for assembled product from customer systems $170_1 \ldots 170_n$ or a sales system 160 containing a database 162 which tracks won and lost contracts. Alternatively or in combination with automatically retrieving input data over network 150, input data may be manually inputted into cost reduction project management software 130.

It will be appreciated, in light of the present description of the invention, that the present invention may be practiced in any of a number of different computing environments without departing from the scope of the invention. For example, the system 100 may be implemented with portions of the cost reduction project management software 130 executing on one or more workstations connected to each other over network 150 or a portion of the cost reduction project management software 130 may execute on a server while a complementary portion of the cost reduction project management software 130 may execute on a workstation networked to the server. Also, other input and output devices such as laptops, handheld devices, or cell phones, for example, may be used, as desired.

One embodiment of the invention has been designed for use on a stand-alone personal computer, laptop, or workstation on an Intel Pentium or later processor, using as an operating system Windows XP, Windows NT, Linux, or the like.

Figure 2:
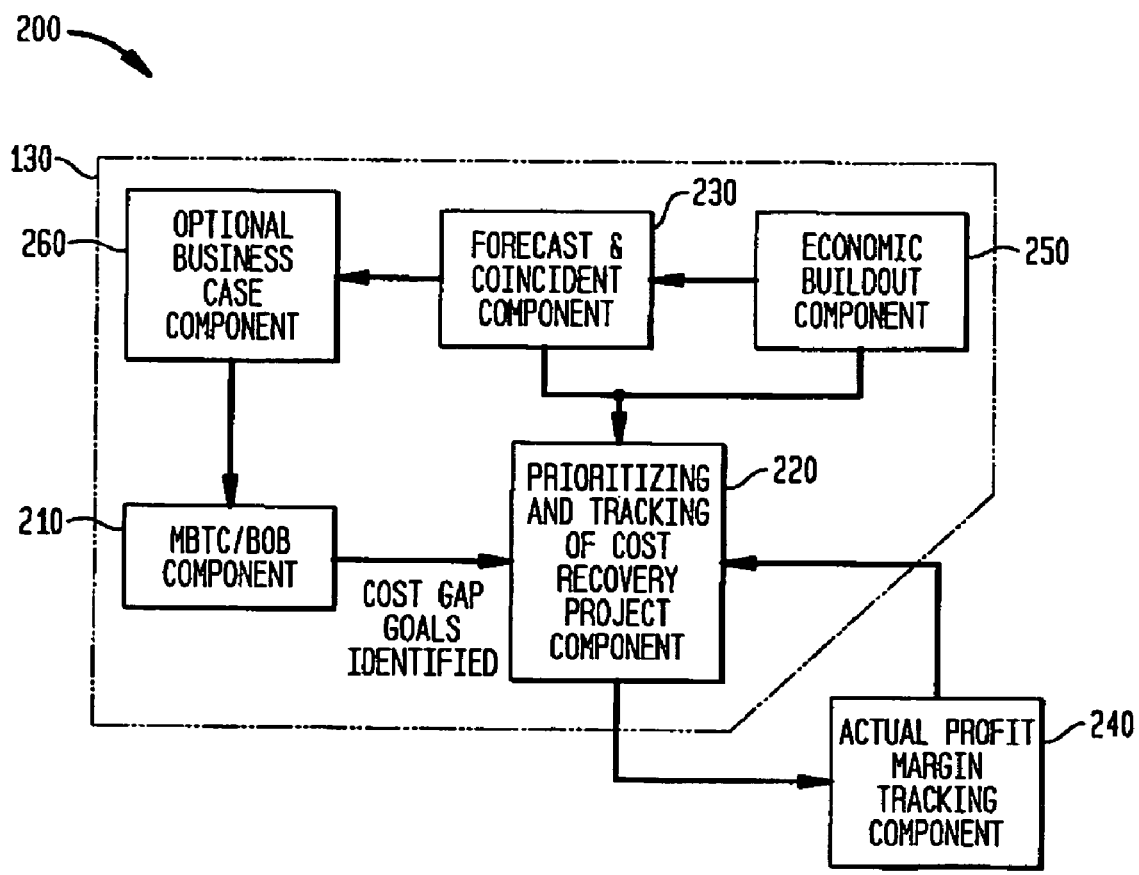
FIG. 2 shows exemplary software components of and interfacing to the cost reduction project management software 130 of FIG. 1 in accordance with the present invention.

FIG. 2 shows the software components of and interfacing to the cost reduction project management software 130 of FIG. 1 for managing cost reduction projects in accordance with the present invention. Cost reduction project management software 130 includes a market based target cost (MBTC)/best of the best (BOB) component 210, a prioritizing and tracking component 220, an economic buildout component 250, a forecast and coincident component 230, and an optional business case component 260. Cost reduction project management software 130 interfaces with a known actual profit margin tracking component 240. The actual profit margin tracking component 240 receives projected cost savings from the prioritizing and tracking of cost reduction project component 220 and revenue data for sold product.

The economic buildout component 250 utilizes cost data of old and new unique subcomponents and weekly and total forecast or demand for an assembled product to determine at what point in time the old assembled product should cease assembly and the new assembled product should begin assembly. An exemplary embodiment of an economic buildout component 250 is discussed further in commonly owned patent application entitled "System and Methods For Reducing Stranded Inventory" U.S. patent application Ser. No. 11/376,504, filed Mar. 15, 2006 concurrently with this application which is hereby incorporated by reference herein in its entirety.

The forecast and coincident component 230 receives sales forecast data for at least one configuration of an assembled product, decomposes the at least one configuration into subcomponents, and determines a forecast schedule over time for the subcomponents composing the one or more configurations. An exemplary embodiment of the forecast and coincident component 230 is discussed further in connection with the discussion of FIG. 8.

The optional business case component 260 compares costs of subcomponents of two or more technologies which address configurations of an assembled product over a period of time. The optional business case component 260 may receive sales forecast data from the forecast and coincident component 230 or from manual input for subcomponents over time and across a variety of configurations of the assembled product. The optional business case component 260 also receives usage data of subcomponents of a technology to address configurations of the assembled product. The optional business case component 260 determines relative cost savings over time between the one or more technologies according to a forecast plan of the assembled product. The optional business case component 260 may automatically select the most cost effective technology for a given forecast plan. The selected technology and corresponding usage data associated with the subcomponents defining the technology may be transferred to the market based target cost (MBTC)/best of the best (BOB) component 210. An exemplary embodiment of the optional business case component 260 is discussed further in commonly owned patent application entitled "System and Methods for Selecting a Least Cost Technology" U.S. patent application Ser. No. 11/376,798, filed concurrently with this application which is hereby incorporated by reference herein in its entirety.

The market based target cost(MBTC)/best of the best (BOB) component 210 receives competitive data on competitor's equivalent product costs, price erosion trends and determines two items. First, a best of the best assembled product is determined by aggregating the least cost subcomponent taken from one or more competitor products or the business enterprise's assembled product. Second, a market based target cost or goal which takes into account a constant profit margin to be achieved at a later point in time. The later point in time is the estimated amount of time it would take to develop and integrate the BOB product. Comparing the subcomponent costs of the BOB product with the business enterprise's assembled product identifies cost gaps of like subcomponents between the two. Additionally, if the BOB product is greater than the market based target cost, the subcomponent costs of the BOB product are reduced accordingly. An example of how to determine the BOB cost and market based target cost(MBTC) is discussed further in commonly owned patent application entitled "System and Methods of Managing Cost Reduction Projects to Increase Cost Savings for Replacement Subcomponents" U.S. patent application Ser. No. 11/376,914, filed concurrently with this application which is hereby incorporated by reference herein in its entirety.

The prioritizing and tracking component 220 receives the fixed cost for developing each new subcomponent, the cutover date from the economic buildout component 250, a general availability date from the design/development team assigned to develop and integrate the new subcomponent into the assembled product and the forecast schedule on a subcomponent basis from the forecast and coincident component 230. The general availability date represents the date at which the new subcomponent will be assembled in the new product for delivery to customers. The prioritizing and tracking component 220 based on cost savings, development cost, and the forecast schedule over which subcomponents will save the most money for the business enterprise over time allows the business enterprise to select which new subcomponents should be pursued. The prioritizing and tracking component 220 also allows subcomponent cost reduction projects to be grouped according to resources assigned or project owners who have authority to assign resource across the group of allows subcomponent cost reduction projects. The prioritizing and tracking component 220 further provides means to advance a GA date for one subcomponent and delay a GA date for another subcomponent in order to save additional total costs. An exemplary embodiment of the prioritizing and tracking component 220 is discussed further in commonly owned patent application entitled "System and Methods for Prioritizing and Tracking Cost Reduction Projects" U.S. patent application Ser. No. 11/376,800, filed concurrently with this application which is hereby incorporated by reference herein in its entirety.

The actual profit margin tracking component 240 receives as input a cost roadmap specifying the cost of subcomponents as a function of time and the actual sales of assembled product containing the subcomponents. The actual profit margin tracking component 240 calculates the total cost of an assembled product containing replaced subcomponents and the total cost of the assembled product containing new subcomponents to calculate a percent reduction in cost. This percent reduction in cost is compared to the BOB product to determine whether the targets/goals established by the MBTC/BOB component 210 are accomplished.

Figure 3A:
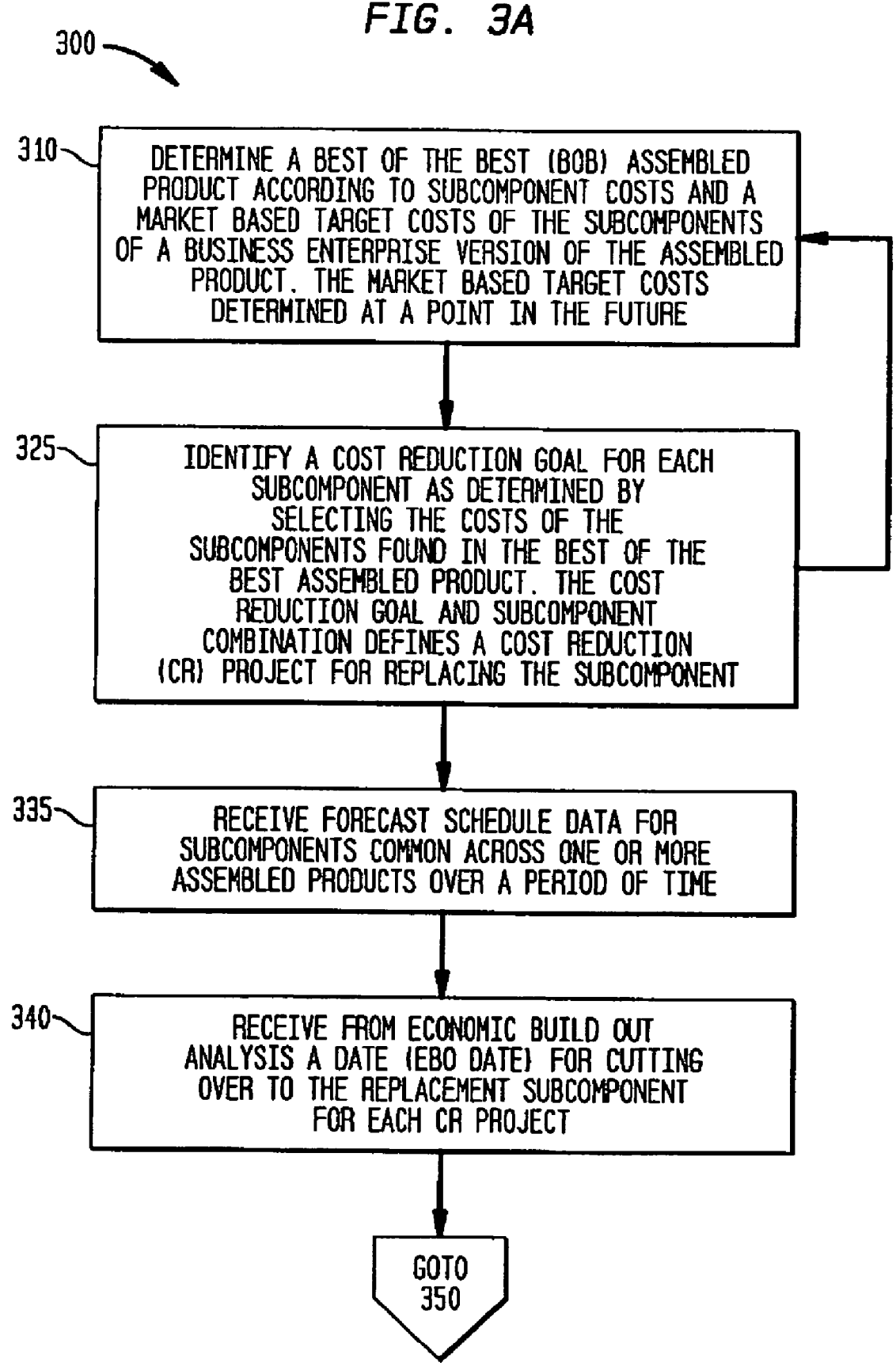
FIGS. 3A and 3B (collectively FIG. 3) show a flow chart of an overall method for managing cost reduction projects in accordance with the present invention.
Figure 3B:
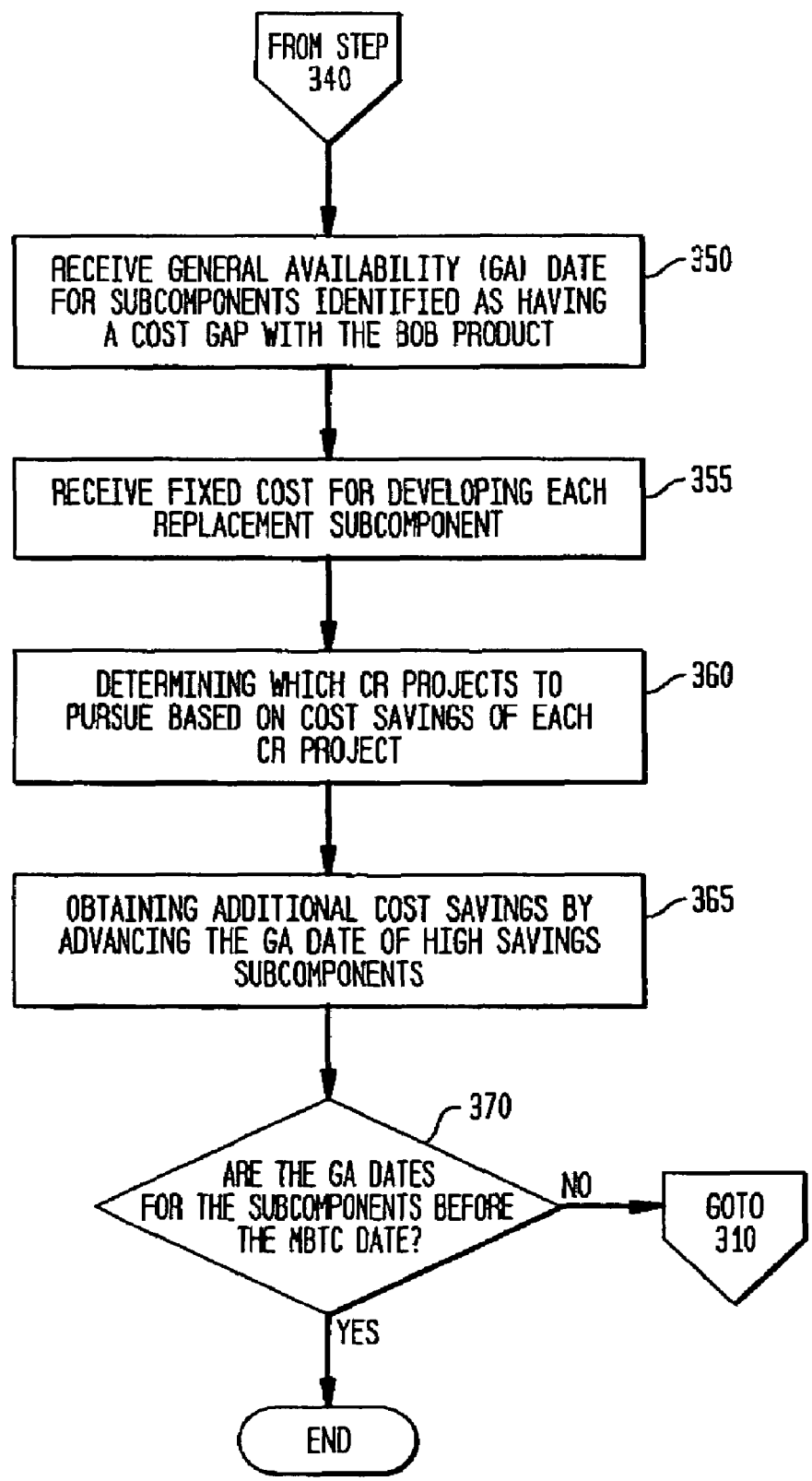

FIG. 3 shows a flow chart of an overall method 300 for managing cost reduction projects in accordance with the present invention. The components of FIG. 2 when executed by system 100 perform one or more of the steps described in the overall method to manage the cost reduction projects. At step 310, a best of the best (BOB) assembled product according to subcomponent costs and market based target costs of the subcomponents of a business enterprise version of the assembled product is determined by, for example, the MBTC/BOB component 210. Further details for determining the BOB assembled product will be discussed in connection with FIG. 4. The market based target costs are determined at a point in the future. The point in the future is a date which initially estimates an amount of time to design, develop and deliver a new assembled product with one or more new subcomponents.

At step 325, a cost reduction goal for each subcomponent is identified by selecting the costs of the subcomponents found in the best of the best assembled product. The cost reduction goal and subcomponent combination defines a cost reduction (CR) project for replacing the subcomponent in a newly assembled product. In some cases, the subcomponent will be replaced with a less expensive version. In other cases, a subcomponent's function may be integrated into a new subcomponent which replaces more than one old subcomponent. At step 335, forecast schedule data for subcomponents common across one or more assembled products over a period of time are received by, for example, the forecast and coincident component 230. Further details for determining forecast schedule data for subcomponents will be discussed in connection with FIG. 5.

At step 340, an economic build out (EBO) analysis date is received. The EBO date indicates the cutover date at which the new product should be assembled in order to either minimize cost and/or stranded inventory. Further details for determining that cutover date are discussed in commonly owned patent application entitled "System and Methods For Reducing Stranded Inventory" U.S. patent application Ser. No. 11/376,505.

At step 350, the general availability (GA) date for subcomponents identified as having cost gaps in step 325 is received by, for example, the prioritizing and tracking component 220. These GA dates may be supplied by a development team assigned to developing the new replacement subcomponent. At step 355, fixed costs for developing each replacement subcomponent are received by, for example, the prioritizing an tracking component 220. The fixed costs may be supplied by project managers assigned to tracking the development projects for each replacement subcomponent.

Due to a business enterprises budgetary and/or resource constraints, it may be too costly to pursue each cost reduction project. At step 360, the set of cost reduction projects to pursue, out of those identified as having cost gaps with the BOB, is determined based on the cost savings produced by each cost reduction project. Further details for determining which cost reduction projects to pursue will be discussed in connection with FIG. 6.

At step 365, additional overall cost savings are obtained by advancing GA dates on subcomponents having high cost savings. Cost savings are advanced when the GA date for a corresponding cost reduction project is made sooner in time. Cost savings are delayed when the GA date for a corresponding cost reduction project is made later in time. Since the GA date is provided by the development team, advancing a GA date would correspond to allocating additional resources to the corresponding cost reduction project and delaying a GA date would typically correspond to removing resources from the corresponding cost reduction project. In order to balance overall resource allocation, when a GA date is advanced on a cost reduction project, a GA date of another cost reduction project is typically delayed. At step 370, the GA dates for all the cost reduction projects are compared against the market based target cost date. Recalling that the MBTC date is an initial estimate, it is compared against the GA dates of the cost reduction projects to see if method 300 should be iterated again. If the GA dates are after the MBTC date, then a new MBTC date should be determined. In that case, method 300 proceeds to step 310. Otherwise, method 300 ends. Further details for extracting additional cost savings determining which cost reduction projects to pursue will be discussed in connection with FIG. 7.

Figure 4A:
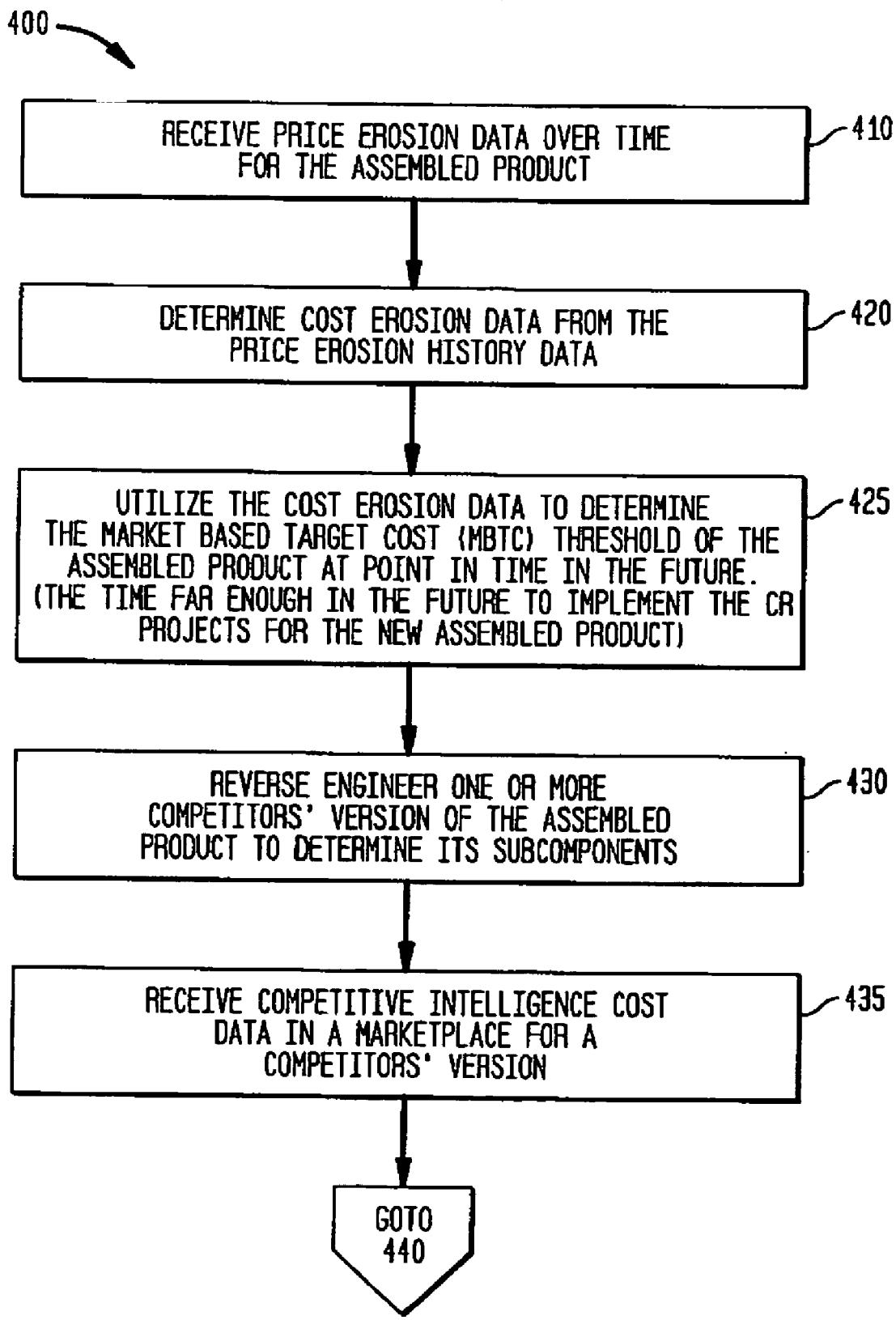
FIGS. 4A and 4B (collectively FIG. 4) show a flow chart of a method for determining a best of the best assembled product according to subcomponent costs and market based target costs in accordance with the present invention.
Figure 4B:
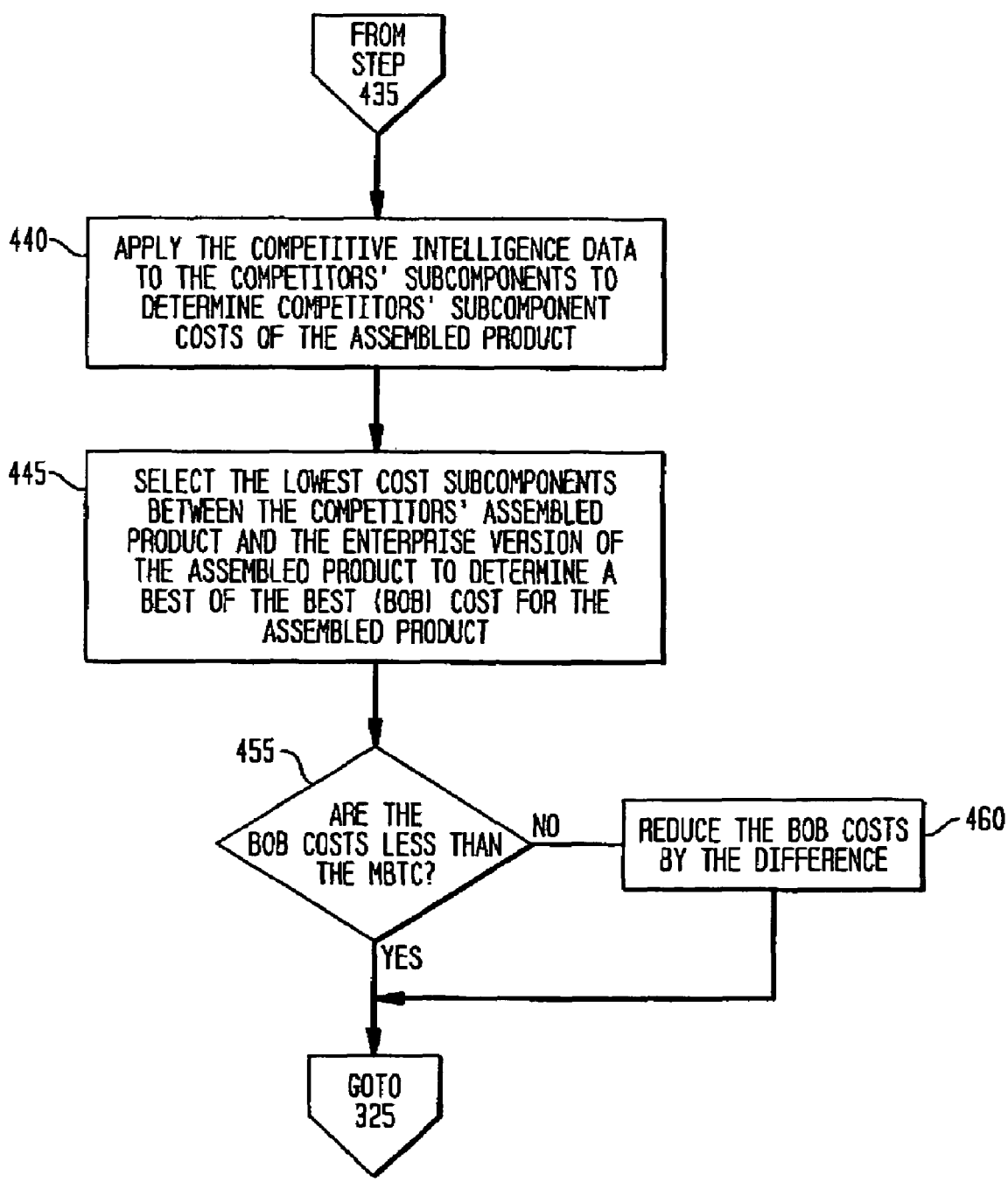

FIG. 4 shows a flow chart of a method 400 for determining a best of the best assembled product according to subcomponent costs and market based target costs in accordance with the present invention. In particular, method 400 further defines step 310 and one or more of the steps of method 400 may be performed by the MBTC/BOB component 210. At step 410, price erosion data over time for an assembled product is received by, for example, the MBTC/BOB component 210. The price erosion data is forward looking in time and reflects a decrease in price due to factors such a shrinking market demand, manufacturing efficiencies, or the like. At step 420, cost erosion data is determined from the price erosion data to sustain profitability. For example, a business enterprise may require a 50% profit margin on an assembled product. In that case, the cost erosion data is found by multiplying the price erosion data by 0.50 at each point in time.

At step 425, the cost erosion data at a particular point in time in the future is a market based target cost (MBTC) which acts as a threshold cost of the assembled product at that particular point in time. The particular point in time is typically set far enough in the future to accomplish the cost reduction projects for a new assembled product. At this point in the overall method 300, the particular point in time is an estimated date rather than a firm date.

At step 430, one or more competitors' versions of the assembled product are reverse engineered to determine their subcomponents. At step 435, competitive intelligence cost data for the competitors' subcomponents are received. At step 440, the competitive intelligence cost data is applied to the competitors' subcomponents to determine the costs of the competitors' subcomponents of the assembled product. The lowest cost subcomponents between the competitors' assembled product and the enterprise version of the assembled product are selected to determine a best of the best (BOB) cost for the individual costs for the subcomponents in the assembled product. At step 450, the method compares the total BOB cost with the MBTC determined in step 425. If the total BOB cost is less than or equal to the MBTC, the BOB cost is more than enough to ensure profitability. Method 400 proceeds to step 325 in overall process 300. If the total BOB cost is greater than the MBTC, the BOB cost for the individual costs for the subcomponents in the assembled product, although reduced from the currently assembled product, will not ensure the business enterprise's profitability. In this case, method 400 proceeds to step 455. At step 455, the BOB cost for the individual costs for the subcomponents in the assembled product is reduced by the difference between the MBTC and the total BOB cost determined in step 445. Various techniques may be utilized to reduce the total BOB cost. One technique includes reducing the cost of each subcomponent composing the BOB product by a pro rata amount. Another technique includes reducing the costs of the highest cost subcomponents, subcomponents whose costs are over a predetermined threshold, by a pro rata amount. Method 400 then proceeds to step 325 utilizing the reduced BOB cost. An example on how to determine the BOB cost and market based target cost (MBTC) will be described in connection with the discussion of FIGS. 8-10.

FIG. 5 shows a flow chart of a method 500 for determining forecast schedule data for subcomponents common across one or more assembled products in accordance with the present invention. In particular, method 500 further defines step 335 and one or more of the steps of method 500 may be performed by the prioritizing and tracking component 220. At step 510, forecast schedule data for one or more assembled products over a period of time is received. The one or more assembled products are composed of subcomponents common between the one or more assembled products. In other words, the one or more assembled products may include varying configurations of an assembled product. The forecast data includes the number of assembled products expected to be sold on a monthly basis for a period of time such as over the next 18 months. At step 520, the forecast schedule data for each assembled product is divided according to its subcomponent composition. At step 530, the divided forecast schedule data is combined according to like subcomponents to define a subcomponent forecast schedule. At step 540, the subcomponent forecast schedule is arranged to meet a demand plan on a monthly basis for each subcomponent across varying assembled product configurations. For example, the subcomponent forecast schedule will indicate the number of each subcomponent expected to be utilized on a monthly basis to satisfy customer orders.

At step 550, contract data including won and lost contracts for the sale of assembled products may optionally be received. If this step is invoked, the subcomponent forecast schedule is updated to reflect additional contracts won and lost. Step 550 allows the subcomponent forecast schedule to dynamically track forecast data at a subcomponent level of granularity. At step 560, forecast schedule data for common subcomponents across one or more assembled products over a period of time is generated. The method 500 returns to step 340 of the overall method 300.

Figure 6:
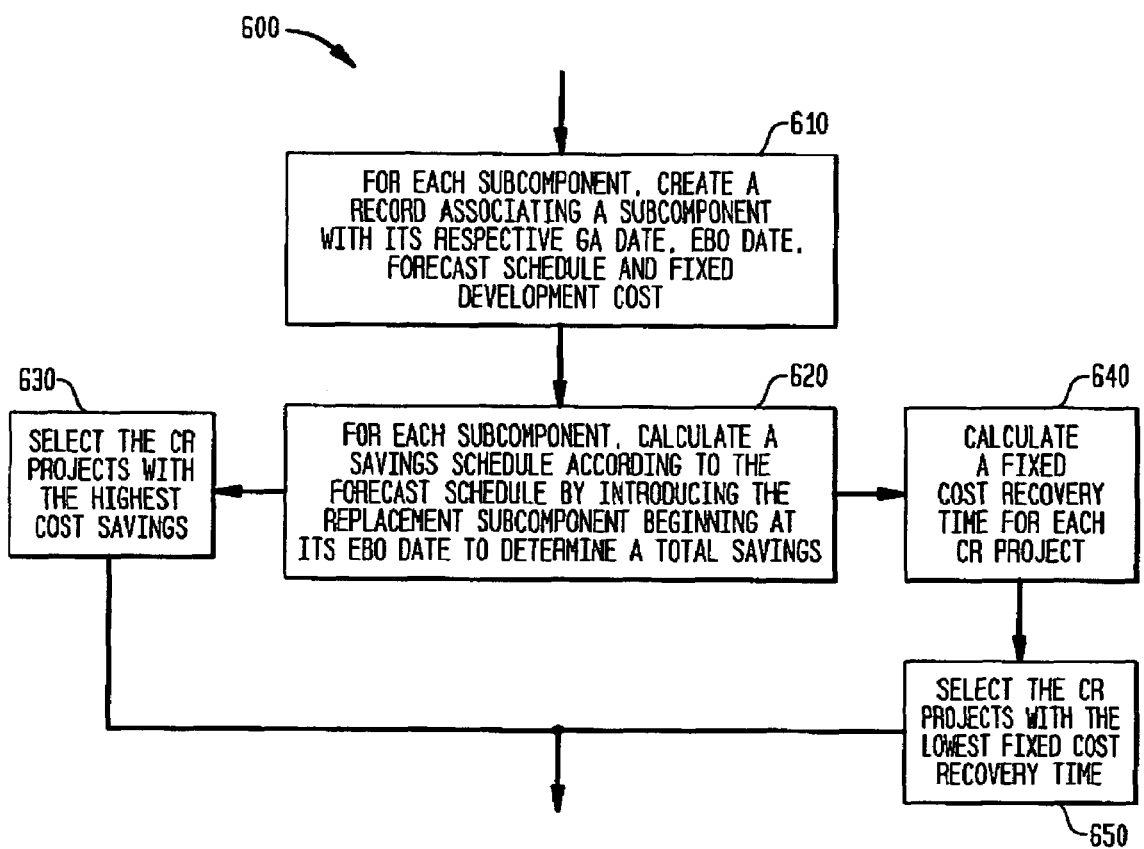
FIG. 6 shows a flow chart of a method for determining the set of cost reduction projects to pursue in accordance with the present invention.

FIG. 6 shows a flow chart of a method 600 for determining the set of cost reduction projects to pursue in accordance with the present invention. In particular, method 600 further defines step 360 and one or more of the steps of method 600 may be performed by the prioritizing and tracking component 220. At step 610, a record is created for each subcomponent associating a subcomponent with its respective GA data, EBO date, subcomponent forecast schedule, and fixed development cost. At step 620, a savings schedule for each subcomponent is created on a monthly basis according to the subcomponent forecast schedule found in FIG. 5. The savings schedule will begin accumulating savings on the date the replacement subcomponent goes into live production, the subcomponent's EBO date.

Two alternative techniques are utilized to select the set of cost reduction projects according to a business enterprise's budgetary constraints. The first technique is defined by step 630. At step 630, the cost reduction projects with the highest total cost savings are selected. The number of cost reduction projects is determined by applying the budgetary constraints to the fixed costs of the highest total cost savings projects until the budgetary constraints are exhausted. The budgetary constraints are consumed by subtracting out the fixed development costs from the highest total cost savings projects until the budgetary constraints are exhausted.

The second technique for selecting the set of cost reduction projects is defined by steps 640 and 650. At step 640, for each subcomponent identified to have a cost gap with the BOB cost, a fixed cost recovery time is calculated. The fixed cost recovery time indicates how long it takes to recover the fixed costs for developing a new subcomponent by savings caused by use of the new subcomponent in the assembled product. The fixed cost recovery time is determined by adding up the monthly cost savings found in step 620 until the sum of the monthly cost savings first equal or exceed the fixed costs for the corresponding new subcomponent. At step 650, the cost reduction projects with the lowest fixed cost recovery times are selected to be pursued. It should be recognized that different multiples of the fixed cost recovery time, such as two times, four times, ten times the fixed costs, and the like, may be utilized by the present invention in order to prioritize the order in which to pursue cost reduction projects.

Figure 7:
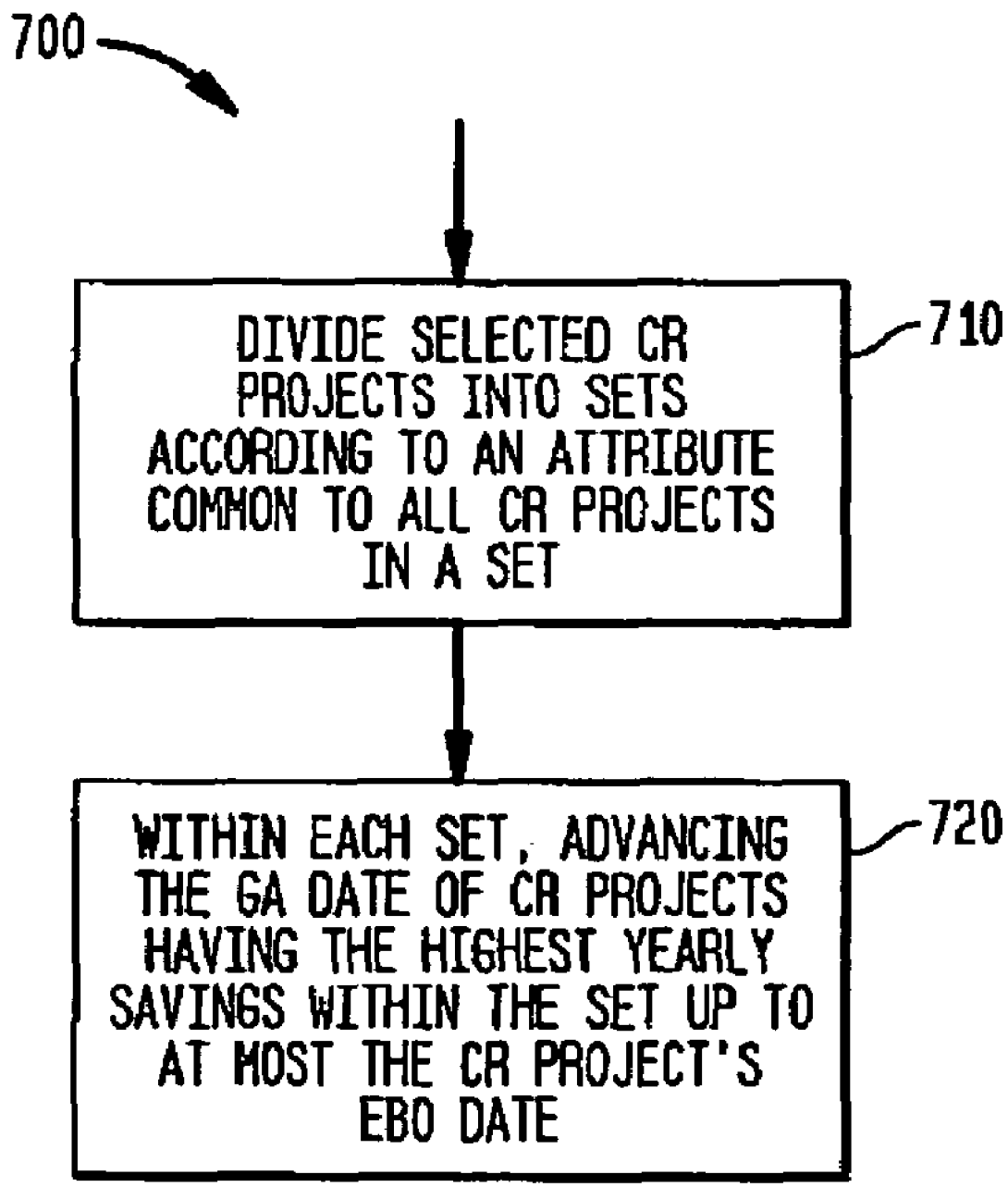
FIG. 7 shows a flow chart of a method for extracting additional overall cost savings by advancing the general availability (GA) date of high savings cost reduction projects in accordance with the present invention.

FIG. 7 shows a flow chart of a method 700 for extracting additional overall cost savings by advancing the GA date of high savings cost reduction projects in accordance with the present invention. In particular, method 700 further defines step 365 and one or more of the steps of method 700 may be performed by the prioritizing and tracking component 220. At step 710, the selected cost reduction (CR) projects found in step 360 are divided into sets where there is a common attribute shared by each of the cost reduction projects. For example, the cost reduction projects may be divided based on design/development personnel resources assigned to the respective cost reduction projects, locations of development resources, suppliers of the corresponding subcomponent, and the like. Preferably, all the cost reduction projects within a set share the same resources for developing their respective new subcomponent. At step 720, within each set, the GA dates of the cost reduction projects having the higher yearly cost savings are advanced earlier in time with advancement limited to their respective EBO date. In order to effectuate an advancement of a GA date, additional resources have to typically be assigned to the respective cost reduction project. As a result, advancing the cost reduction projects having the highest yearly cost savings may cause one or more cost reduction projects in the same set to have their GA dates delayed. Conversely, delaying a cost reduction project having a lower yearly cost savings, one or more cost reduction projects in the same set having high yearly cost savings may be advanced depending on the relative fixed cost of the delayed cost reduction project.

Each set of CR projects may be assigned to a project owner where the project owner is responsible for analyzing the cost savings of the set of CR projects, advancing the GA dates of higher cost saving CR projects, and, potentially, delaying the GA dates of lower cost savings CR projects. Alternatively, the prioritizing and tracking component 220 may include a threshold automatically categorizing those projects whose cost savings exceed the threshold as higher cost saving CR projects and categorizing those projects whose cost savings do not exceed the threshold as lower cost saving CR. In this environment, the GA dates of the higher cost saving CR projects may be advanced automatically, and the GA dates of the lower cost savings CR projects may be delayed automatically.

An exemplary embodiment of how additional cost savings are achieved by advancing the GA date and there effects thereto are discussed further in commonly owned patent application entitled "System and Methods for Prioritizing and Tracking Cost Reduction Projects" U.S. patent application Ser. No. 11/376,800.

FIG. 8 shows an exemplary spreadsheet 800 utilized as implementing the forecasting and coincident component 230 in accordance with the present invention. Spreadsheet 800 includes input areas 810, 815, 820, and 830. Spreadsheet 800 also includes output areas 840 and 850. Input area 810 reflects various configurations or product mixes presently available or to be designed for an assembled product. Columns B, C, and D in input area 810 contain labels indicating three different configurations of an assembled product. Referring to input area 830, configuration 1 of the assembled product contains 1 cabinet, 3 radios, 6 filters, 3 amplifiers, and 1 backplane. Configuration 2, on the other hand, contains 1 cabinet, 6 radios, 6 filters, 6 amplifiers, and 1 backplane. Each column in input area 830 is referred to as the usage factor for a particular configuration. Input area 815 contains the total year demand for the three configurations of the assembled product. The data input area 815 is determined by contracts for sales of assembled product. As the sales of any of the configurations go up, the total year demand for the corresponding configuration goes up accordingly. Consequently, when contracts are won or lost the data in input area 815 is modified manually or programmatically to reflect those sales conditions.

When modified programmatically, the prioritizing and tracking component 220 allows for continuous input of supplier contracted pricing and direct purchase component costs. The prioritizing and tracking component 220 continuously multiplies the usage factors in input area 830 by updated forecast data for each assembled product configuration.

Input area 820 distributes the yearly demand from input area 815 across the four quarters in a year according to the delivery time on contracts. Output area 840 determines the total annual forecast for each individual subcomponent such as the cabinet, radio, filter, amplifier, and backplane on a subcomponent basis. Output area 850 distributes the total annual forecast for each individual subcomponent on a subcomponent basis across each quarter to meet the assembled product forecast in input area 820. Furthermore, within each quarter, output area 850 distributes the quarterly forecast for each subcomponent on a subcomponent basis across each month in the respective quarter.

By utilizing spreadsheet 800, new assembled product configurations may be easily added by inserting new columns, existing configurations may be easily modified by changing the entries in input area 830, and old configurations may be easily removed by clearing the contents of a respective configuration or deleting the respective column for the configuration. By making any of the previous adjustments to the spreadsheet, the effect on the content in output areas 840 and 850 will automatically be updated to see the forecasted demand for a particular subcomponent in any month.

It should be recognized that the input areas 810, 815, 820, and 830 may be records stored in memory or in a database on computer system 100. In that environment, the contents of output areas 840 and 850 may be calculated and associated as additional fields to those records. In either embodiment, contents of output areas 840 and 850 are inputted to or retrieved by the prioritizing and tracking component 220. It should also be recognized that the length in time forecasts on a subcomponent basis may be extended is dependent on how far out in the future data exists on forecasts for the assembled product.

While the present invention has been disclosed mainly in the generic context of sub-components and assembled products, it will be recognized that the present teachings are applicable to all manufactured products such as cell phones, internet protocol (IP) routers, wireless access points, or the like, which contain components manufactured or assembled by multiple suppliers.

We claim:

1. A computer implemented method for translating forecast sales data of at least one configuration of an assembled product into a forecast schedule for replacing a subcomponent utilized in the assembled product, the method comprising:

receiving forecast sales data of at least one configuration of the assembled product;

receiving a usage factors of a subcomponent utilized in the at least one configuration of the assembled product wherein the configuration of the assembled product comprises a configuration of subcomponents;

receiving a general availability date of a replacement subcomponent indicating the date that the replacement subcomponent is ready for assembly into the at least one configuration of the assembled product; and composing a forecast schedule for replacing the subcomponent utilized in the at least one configuration of the assembled product by applying the usage factor of the subcomponent and the general availability date of the replacement subcomponent to the forecast sales data of the at least one configuration of the assembled product, wherein the forecast schedule includes demand for the subcomponent over time and assembled product cost savings in using the replacement subcomponent.

2. The computer implemented method of claim 1 wherein the step of receiving forecast sales data of at least one configuration of the assembled product is received continuously and wherein the forecast schedule over time is correspondingly updated.

3. The computer implemented method of claim 1 further comprising:

adding a new configuration of the assembled product; and adding additional usage factors for a plurality of subcomponents composing the configurations of the assembled product, the additional usage factors corresponding to the new configuration of the assembled product, said forecast schedule over time automatically updated in response to the newly added configuration.

4. The computer implemented method of claim 3 further comprising:

deleting one of the at least one configuration of the assembled product, said forecast schedule over time automatically updated in response to the deleted configuration.

5. The computer implemented method of claim 1 wherein the received forecast sales data includes orders for the at least one configuration of the assembled product resulting from a won contract.

6. The computer implemented method of claim 1 wherein the received forecast sales data includes orders for the at least one configuration of the assembled product resulting from a lost contract.

7. The computer implemented method of claim 1 wherein the at least one configuration of the assembled product comprises two or more configurations of the assembled product.

8. A computer readable medium whose contents cause a computer to translate forecast sales data of at least one configuration of an assembled product into a forecast schedule for replacing a subcomponent utilized in the assembled product, by performing the steps of:

receiving forecast sales data of at least one configuration of the assembled product;

receiving a usage factor of a subcomponent utilized in the at least one configuration of the assembled product wherein the configuration of the assembled product comprises a configuration of subcomponents;

receiving a general availability date of a replacement subcomponent indicating the date that the replacement subcomponent is ready for assembly into the at least one configuration of the assembled product; and composing a forecast schedule for replacing the subcomponent utilized in the at least one configuration of the assembled product by applying the usage factor of the subcomponent and the general availability date of the replacement subcomponent to the forecast sales data of the at least one configuration of the assembled product, wherein the forecast schedule includes demand for the respective subcomponents over time and assembled product cost savings in using the replacement subcomponent.

9. The computer readable medium of claim 8 wherein the step of receiving forecast sales data of at least one configuration of the assembled product is received continuously and wherein the forecast schedule over time is correspondingly updated.

10. The computer readable medium of claim 8 further comprising:

adding a new configuration of the assembled product; and adding additional usage factors for a plurality of subcomponents composing the configurations of the assembled product, the additional usage factors corresponding to the new configuration of the assembled product, said forecast schedule over time automatically updated in response to the newly added configuration.

11. The computer readable medium of claim 10 further comprising:

deleting one of the at least one configuration of the assembled product, said forecast schedule over time automatically updated in response to the deleted configuration.

12. The computer readable medium of claim 8 wherein the received forecast sales data includes orders for at least one configuration of the assembled product resulting from a won contract.

13. The computer readable medium of claim 8 wherein the received forecast sales data includes orders for at least one configuration of the assembled product resulting from a lost contract.

14. The computer readable medium of claim 8 wherein the at least one configuration of the assembled product comprises two or more configurations of the assembled product.

15. A system for translating forecast sales data of at least one configuration of an assembled product into a forecast schedule for replacing a subcomponent utilized in the assembled product, the system comprising:

means for receiving forecast sales data of at least one configuration of the assembled product;

means for a receiving usage factor of a subcomponent utilized in the at least one configuration of the assembled product wherein the configuration of the assembled product comprises a configuration of subcomponents;

receiving a general availability date of a replacement subcomponent indicating the date that the replacement subcomponent is ready for assembly into the at least one configuration of the assembled product; and means for composing a forecast schedule for replacing the subcomponent utilized in the at least one configuration of the assembled product by applying the usage factor of the subcomponent and the general availability date of the replacement subcomponent to the forecast sales data of the at least one configuration of the assembled product, wherein the forecast schedule includes demand for the subcomponent over time and assembled product cost savings in using the replacement subcomponent.

16. The system of claim 15 wherein the means for receiving forecast sales data of at least one configuration of the assembled product operates to receive continuously causing the forecast schedule over time to be correspondingly updated.

17. The system of claim 15 further comprising:
means for adding a new configuration of the assembled product; and
means for adding additional usage factors for a plurality of subcomponents composing the configurations of the assembled product, the additional usage factors corresponding to the new configuration of the assembled product, said forecast schedule over time being automatically updated in response to the newly added configuration.

18. The system of claim 17 further comprising:
means for deleting one of the at least one configuration of the assembled product, said forecast schedule over time being automatically updated in response to the deleted configuration.

19. The system of claim 15 wherein the received forecast sales data includes orders for the at least one configuration of the assembled product resulting from a won contract.

20. The system of claim 15 wherein the received forecast sales data includes orders for the at least one configuration of the assembled product resulting from a lost contract.

* * * * *